H. S. FISHER.
Fruit Can.
No. 2,801. Reissued Nov. 19, 1867.
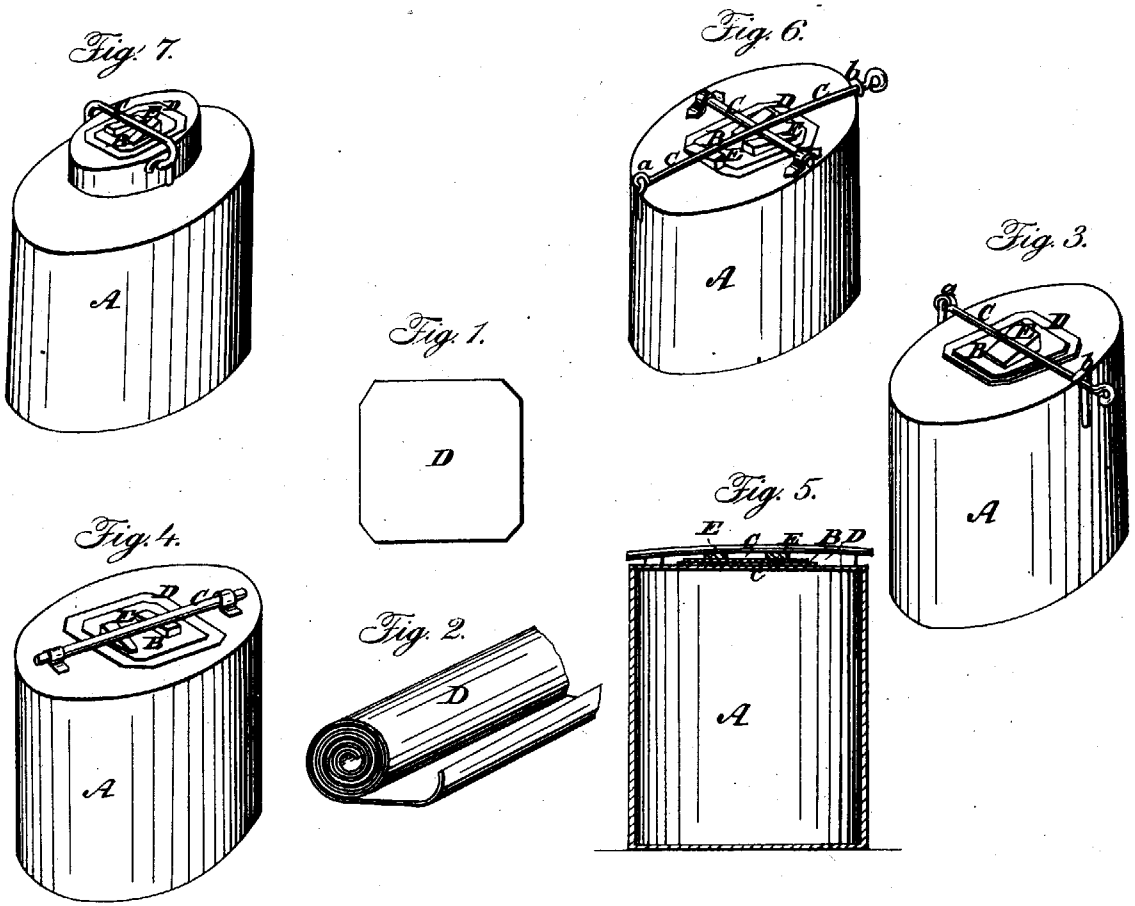
Witnesses:
Gustavus Dieterich.
S. B. Black.
Inventor:
Henry S. Fisher.
by his Attys
Robt W. Heymrich &
D. C. Lawrence.

UNITED STATES PATENT OFFICE.

HENRY S. FISHER, OF NEWBURG, PENNSYLVANIA.

IMPROVEMENT IN SEALING PRESERVE-CANS.

Specification forming part of Letters Patent No. 33,729, dated November 12, 1861; Reissue No. 2,801, dated November 19, 1867.

*To all whom it may concern:*

Be it known that I, HENRY S. FISHER, of Newburg, in the county of Cumberland and State of Pennsylvania, have invented a new and useful Article for Hermetically Sealing Preserve-Cans; and I do hereby declare that the following is a full, clear, and exact description thereof, reference being had to the accompanying drawings, making a part of this specification, in which—

Figure 1 is a view of a sheet of the improved sealing material cut of the proper form for application to a can or jar. Fig. 2 is a roll of the material. Figs. 3, 4, 5, 6, and 7 are views of several preserve-cans and jars, which are designed to show some of the modes of using the sealing material.

Similar letters of reference indicate corresponding parts in the several figures.

The object of this invention is to furnish an improved article for hermetically sealing preserving cans, jars, and other vessels, in which it is desired to prevent the entrance of air, which article is designed to obviate many of the objections to, and serve as a substitute for, india-rubber sealing-rings and pallets, and also those modes of sealing vessels which require melted cement to be run into grooves or recesses around the joints of stopples or covers of vessels.

The invention is also designed to obviate objections attending the use of a woven fabric coated with an adhesive substance, which I believe some attempt has been made to use for the purpose of sealing vessels.

The nature of my invention consists in paper which is both saturated and covered or coated with an adhesive substance, or a composition of substances, that will soften under the influence of a gentle heat, and become hard, or moderately hard, when cool, said paper to be prepared either in large sheets or rolls, to be afterward cut up into rings, squares, or pieces of any suitable shape and size; or the paper may be cut into pieces of proper shape and size previously to saturating and coating it with the adhesive substance, as will be hereinafter described.

To enable others skilled in the art to understand my invention, I will describe the most preferable modes of carrying it into effect.

I take paper of any required thickness which has not been sized and immerse it in a bath, which may be composed of equal parts of beeswax and rosin, and allow it to remain in such liquid until it has become thoroughly saturated and covered with the composition. This composition may be boiled and kept in a boiling state during the immersion of the sheets; or it may be kept at a moderate degree of heat, so as to render it liquid and permeating. If desirable, the sheets of paper may be immersed several times in the heated composition, so as to give them a very thick coating upon both surfaces; or the thickness of the coating may be increased by applying the composition to the surfaces of the paper with brushes after the body or substance of the paper has been thoroughly saturated with the composition. For all ordinary purposes one application to or immersion of the sheets in a bath of cement will answer the purpose, and leave a proper thickness of the cement upon their surfaces. The sheets thus saturated and coated are then pressed and rolled so as to compress the cement and paper firmly, and thus leave its surface level and smooth, and greatly increase the solidity and durability of the article produced. The sheets thus prepared are to be cut up into pieces varying in size and shape, according to the size and shape of the opening which they are desired to cover.

I prefer to cut the paper into rings, disks, squares, or other properly-shaped pieces, previous to preparing it with cement, because in this way there is little or no waste of stock as there might be in cutting up the prepared sheets or rolls, and the paper when cut up is as readily prepared with cement and pressed as it is in large sheets. I do not, however, confine myself to the use of large or small sheets or pieces, nor to rolling or pressing devices, nor to other tools which may be found convenient in the operation of preparing the paper.

One great advantage in the use of paper over muslin or any woven fabric in making the sealing sheets or pieces is that paper properly made will become thoroughly permeated and saturated with the adhesive cement, so that, whether the cement is warm or cold, air cannot be forced through the prepared paper under ordinary pressure. Paper will so completely imbibe the cement as to prevent the scaling or peeling off of the surface-coating. Woven fabrics coated with a cement which will answer the purpose of sealing cans or jars will allow air to pass through them in consequence of their being more porous than paper, the pores or interstices between the woven threads being so large that the cement is not properly held, particularly when subjected to atmospheric pressure while it is warm and soft. Paper, on account of its closeness of texture and evenness of surface, will retain the cement within its body and upon its surfaces, and it will be impervious to air and moisture.

I have described as a very good cement a composition of beeswax and rosin melted together in about equal parts, and I prefer to use these substances; but I have obtained very good results by using tallow and rosin. I do not therefore confine myself to the substances mentioned of which to make the cement.

Having described the manner of preparing paper so as to obtain self-adhesive sealing sheets, rings, or pieces for sealing preserving cans and jars or other vessels which it is desired to make air-tight, I will now describe some of the many modes in which I contemplate employing the prepared paper.

In the accompanying drawings, A represents a sheet-metal preserve-can, with a hole, *c*, made through the center of its top, which top is perfectly flat, so as to receive upon it a flat cover or cap, B, which will fit snugly upon it.

C is a spring-rod placed over the cap B, which rod is hinged or linked at *a* and confined by a hook or catch at *b*.

D is the prepared paper pallet, which is interposed between the cap B and top of the can, so as to close the central hole, *c*, and overlap the metal surrounding this hole, as shown.

E is a wedge, which is inserted between the spring-rod C and the cap B, the object of which is to cause said spring to forcibly hold the cap down in place.

In Figs. 4, 5, and 6, modifications of the retaining device are shown, and in Fig. 7 a mode of applying the improved seal to glass and other jars with necks, is shown. These seals or pieces of paper, prepared substantially as described, answer effectually as a ready and convenient means for hermetically sealing the joints between the caps and tops of the cans or jars, and are at the same time free from the objections found to exist in the use of melted cement.

The improved self-adhesive seals make a neat and clean joint, and dispense with the use of heated irons or tools, the heat of the contents of the can or jar being all that is required to effect the softening and adhesion of the composition, and the pressure of the retaining device to effect the attachment of the seal to the surfaces of the cap and can or jar and to make a tight joint.

My improvement will effect a great saving of expense and time to families, as the fruit or other articles put up will certainly be preserved from the effect of the external air, and after the fruit is used the cans or jars will be in a good condition for a second use, as the pallets or seals, with all of the composition adhering to them, are lifted from the cans when a knife-blade is inserted beneath them; and while these advantages are secured my improved seals, by being coated with a substance which is not affected by acids, obviate the objections to the use of rubber pallets and rings, which impart a disagreeable taste or scent to the articles preserved in cans to which they are applied.

While I have shown and described several modes of confining the self-adhesive seals to cans, I do not confine my invention to any particular form or kind of retaining or fastening device, as these devices will vary in construction according to the varying sizes and shapes of the seals which it is found necessary to be used upon different cans or jars. I use rosin, because it will soften and become adhesive when subjected to moderate degrees of heat, and when cool will become hard again; and I use wax or tallow because it renders the rosin soft and pliable when cool, and prevents the cement from cracking and scaling off, thereby enabling me to make a self-adhesive seal which can be sold in the market ready for use, and which will not be impaired by handling. I therefore desire to be understood, in the use of the words "resin" and "wax," or other equivalent substances, as meaning any substance or substances possessing the same properties in the particulars set forth.

Having described my invention, what I claim as novel, and desire to secure by Letters Patent, is—

1. A self-adhesive seal which is prepared either in the form of a sheet, ring, disk, or piece of any required size or shape, and composed of paper which is thoroughly saturated and coated on its surface with a cement composed of the within-described substances, or the respective equivalents thereof, substantially as described, and for the purpose specified.

2. A self-adhesive seal which is composed of paper thoroughly saturated and coated with a rosin cement, and afterward subjected to considerable pressure, so as to adapt the seal for hermetically closing preserving-vessels, substantially as described.

3. A seal which is composed of paper and cement, in combination with a compressing and retaining device, C, or its equivalent, substantially as and for the purposes described.

HENRY S. FISHER.

Witnesses:

H. K. HOCH,

CHAS. H. FOHL.